April 12, 1966 A. M. MULTARI ETAL 3,246,209
CONTROL APPARATUS
Filed July 6, 1961
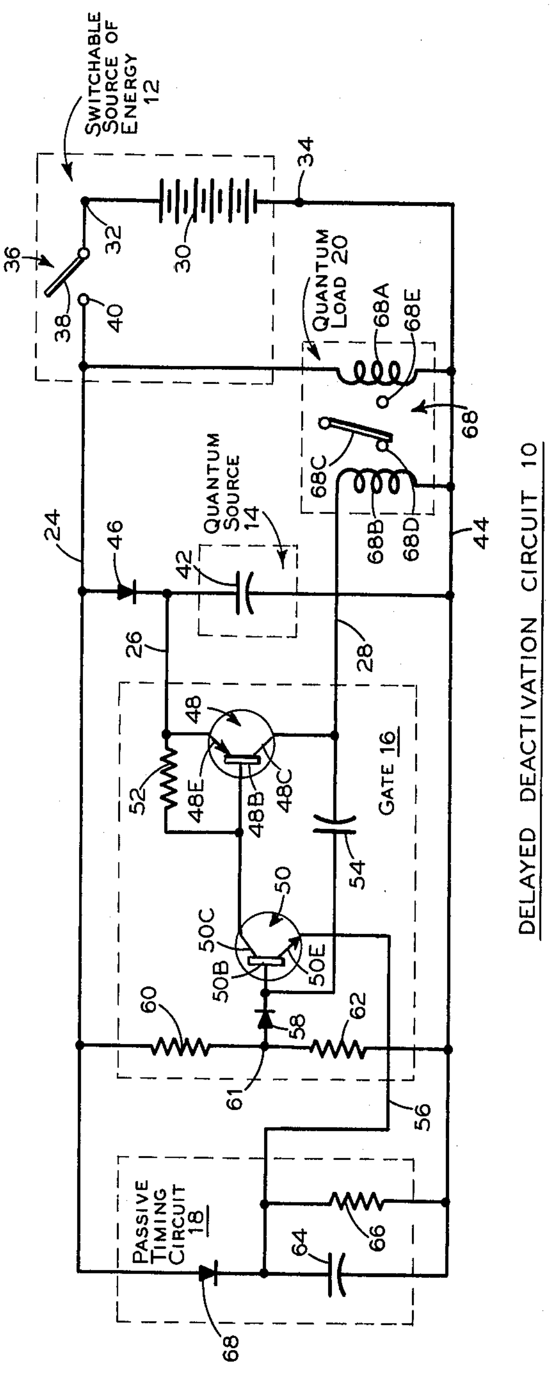
INVENTORS
Alfred M. Multari
Emanuel Poulos
BY S.C. Yuter
ATTORNEY United States Patent Office 3,246,209

Patented Apr. 12, 1966

3,246,209
CONTROL APPARATUS

Alfred M. Multari, West Hempstead, and Emanuel Poulos, Huntington, N.Y., assignors to Tempco Instrument Incorporated, Plainview, N.Y., a corporation of New York Filed July 6, 1961, Ser. No. 122,174
8 Claims. (Cl. 317—142)

This invention relates to control apparatus and more particularly to control apparatus which delays the deactivation of a controlled circuit.

In many control operations it is often necessary to simultaneously activate several controlled elements, but to delay the deactivation of some of the controlled elements for a given period of time after the deactivation of others of the controlled elements. Heretofore, complicated delay circuits have been employed to accomplish the delayed deactivation. These circuits, in spite of their complexity, have been unable to introduce highly precise time delays which endure greater than milliseconds. Conventional time delay circuits which are to operate in and above the millisecond range require components that are so large and heavy that they cannot be used in airborne and space equipment where space and weight are at a premium. Furthermore, such devices generally continue to consume power from an external source during the timing period.

It is accordingly a general object of the invention to provide an improved timed control apparatus.

It is another object of the invention to provide an improved control apparatus which delays the deactivation of a controlled apparatus for a given period of time after the operation of another control apparatus.

It is yet another object of the invention to provide a delay device which does not absorb power from an external source once the timing period of the delay is initiated.

It is a further object of the invention to satisfy the above objects with a control apparatus which is on the one hand light in weight, small in volume and inexpensive and which is, on the other hand, extremely reliable and capable of introducing long term time delays.

Briefly, in accordance with one embodiment of the invention, a control apparatus is provided which includes a first or external source of energy that primes a second or internal source of energy and a timed gating or switching means upon application of the first source of energy to the apparatus. The removal of the first source of energy from the apparatus initiates the activation of the timed gating means which after a predetermined period of time causes the transfer of energy from the second source of energy to a load.

Other objects, features and advantages of the invention will be apparent from the following detailed description when read with the accompanying drawing in which the sole figure shows a delayed deactivation circuit which is an exemplary embodiment of the invention.

Referring to the sole figure, the delayed deactivation circuit 10 comprises a switchable source of energy 12 which, when switched on, transmits electrical energy via line 24 to quantum source 14 and timed gating means comprising gate 16 and passive timing circuit 18. Quantum source 14 and timed gating means are primed, i.e., quantum source 14 is prepared to deliver energy and timed gating means is prepared to generate a timing interval. When switchable source of energy 12, the external source, is switched off, the timed gating means commences a timing interval. (From this time on no energy is required from an external source.) At the end of a predetermined time, the timed gating means permits the transfer of the energy of quantum source 14 via line 26, gate 16 and line 28 to quantum load 20. It should be noted that the term quantum is hereindefined to be a fixed quantity. Therefore, quantum source 14 is capable of delivering a fixed quantity of electrical energy and quantum load 20 requires a fixed quantity of electrical energy before it can operate. Quantum load 20 can also be considered as a pulsed load, i.e., a pulse of energy is required to activate or operate the load.

More particularly, switchable source of energy 12 includes a source of potential 30 having a positive terminal 32 and a negative terminal 34, and a switch 36 having a moving contact 38 connected to positive terminal 32 and a fixed contact 40 connected to line 24. Quantum source 14 is a storage capacitor 42 having one terminal coupled via line 44 to negative terminal 34, and another terminal coupled via diode 46 to line 24. Diode 46, a unidirectional conducting means, is polarized to permit the passage of conventional current from line 24 to storage capacitor 42.

Gate 16 includes PNP transistor 48 having an emitter 48E, a collector 48C and a base 48B, and NPN transistor 50 having an emitter 50E, a collector 50C and a base 50B. Collector 48C is connected to line 28 and via feedback capacitor 54 to base 50B. Emitter 48E is connected to line 26 and via resistor 52 to base 48B. Collector 50C is coupled to base 48B. Emitter 50E is coupled via line 56 to passive timing circuit 18. Base 50B is coupled via diode 58 to junction 61 of serially connected biasing resistors 60 and 62 which are connected across lines 24 and 44. Diode 58, a unilaterally conducting element, is polarized so that conventional current can only flow from the junction 61 to the base 50B.

Passive timing circuit 18 includes capacitor 64 and resistor 66 coupled, in parallel between lines 56 and 44. Diode 68, a unilateral conducting device, couples capacitor 64 to line 24 and only permits conventional current to flow from line 24 to capacitor 64.

The input to passive timing circuit 18 at diode 68 may be considered as the control input of the timed gating means comprising gate 16 and passive timing circuit 18. Quantum load 20 is a latching relay having a first winding 68A serially interposed between line 24 and line 44, a second winding 68B serially connecting line 28 to line 44, a moving contact 68C and fixed contacts 68D and 68E which may be coupled to a controlled circuit (not shown).

The operation of delayed deactivation circuit 10 will now be described. When moving contact 38 is moved against fixed contact 40 of switch 36, current flows via diode 46 to charge storage capacitor 42, via diode 68 to charge capacitor 64, and current flows through winding 68A to operate latching relay 68. Moving contact 68C moves against fixed contact 68E and latching relay 68 assumes a first state. The potential on lines 26 and 56 become substantially equal to the potential of positive terminal 32. Since emitter 50E is coupled to line 56 it is also at this potential level. However, because of the potential divider action of resistors 60 and 62, junction 61 and base 50B are at a lower potential level. Because transistor 50 is of the NPN type, these potential levels back bias its base-emitter junction and transistor 50 is non-conducting. By virtue of the non-conduction of transistor 50 no base current can flow from base 48B and, therefore, transistor 48 is in a non-conducting state. No current can flow from line 26 to line 28. Thus, gate 16 is blocked or acts like an open switch and thus can be considered as switching means having normally open terminals connected respectively to lines 26 and 28.

It should be noted that feedback capacitor 54 is charged to a potential substantially equal to the potential at junction 61.

When moving contact 38 is moved away from fixed contact 40 of switch 36, a timing interval is initiated. At this time, capacitor 64 starts discharging through resistor 66. The rate of discharge is determined by the time constant of the circuit, i.e., the product of magnitude of the resistance of resistor 66 and the capacitance of capacitor 64. The greater this product, the longer the time of discharge. While the discharge occurs, the potential on line 56 starts falling. When this potential on line 56 is slightly less than the potential of feedback capacitor 54, transistor 50 starts conducting, for the potential at the base 50B is slightly greater than the potential at the emitter 50E. The current flowing through transistor 50, from colector 50C to emitter 50E, is drawn from base 48B of transistor 48 which, therefore, starts conducting. Current, accordingly, flows from storage capacitor 42 through emitter 48E and collector 48C to winding 68B. A voltage is developed across winding 68B which raises the potential on line 28. This potential rise on line 28 is transmitted via feedback capacitor 54 to base 50B causing transistor 50 to conduct more heavily. The action is cumulative and continues until both transistors 48 and 50 are driven into saturation. At that point, there is, effectively, a short circuit between storage capacitor 42 and winding 68B which causes all the energy stored in storage capacitor 42 to be transferred to winding 68B. The quantity of energy received by winding 68B is sufficient to cause moving contact 68C of latching relay 68 to move into contact with fixed contact 68D.

As capacitors 64 and 54 continue to discharge through circuit components including resistor 66, transistor 50 and relay coil 68B, the transistors 50 and 48 will ultimately again be non-conducting. This is evident from the fact that with switch 36 open, battery 30 cannot supply power to the transistors 48 and 50, nor even to any other components of the illustrated delayed deactivation circuit 10. Therefore current flows through coil 68B only temporarily, but contact 68C continues to engage contact 68D; this follows from the well known properties of a latching relay. Transfer of contact 68C occurs on the next closure of switch 36.

It is therefore seen that the described circuitry as a whole, and the two-state device including transistors 48 and 50, consume a minimum of power from battery 30. When switch 36 is initially closed, current drain on the battery is due to the charging currents of capacitors 42, 54, 64, bias current through resistors 60 and 62, and current through relay coil 68A. Both transistors 48 and 50 are non-conducting. When switch 36 is opened, there is of course no further current drain on battery 12 Transistors 48 and 50 are rendered conductive temporarily, and thereafter non-conductive once more.

The described delayed deactivation circuit 10 is remarkable in that, despite its limited power requirements, it is capable of providing accurate timing in the millisecond range. Also, the two-state device comprising transistors 48 and 50 is unique in the respect that normally both stages are non-conducting, and that when conducting they conduct for very limited time intervals; this is in contrast to conventional two-state devices wherein one stage conducts at all times while the other is non-conducting.

The following are representative values of the elements of the disclosed embodiment, but it should be apparent to those skilled in the art that other values are within the scope of the invention:

| | |
|---|---|
| Resistor **52** | 50,000 ohms. |
| Resistor **60** | 1,500 ohms. |
| Resistor **62** | 1,500 ohms. |
| Resistor **66** | Dependent upon time delay required (1,000,000 ohms). |
| Capacitor **42** | 100 microfarads. |
| Capacitor **54** | 10 microfarads. |
| Capacitor **64** | Dependent upon time delay required. |
| Diode **46** | 1N482. |
| Diode **58** | 1N482. |
| Diode **68** | 1N482. |
| Transistor **48** | 2N1131. |
| Transistor **50** | 2N332. |
| Relay **68** | Potter & Brumfield latching relay. |
| Source of potential **30** | 30 volt battery. |

There has thus been shown improved control apparatus for delaying the deactivation of a controlled circuit which by employing a passive timing circuit that controls the activation of a gating circuit that permits the flow of a quantity of electrical energy from a source of electrical energy to a load, provides a delayed deactivation circuit which can introduce time delays of considerable duration by the use of small inexpensive and light components.

Although only one embodiment of the invention has been shown, it will be apparent to those skilled in the art that many modifications which do not depart from the spirit of the invention are possible. For example, quantum load 20 may be any device which requires a pulse of energy such as a squib for operation. Similarly, quantum source 14 need not be a storage capacitor but can be any device which can deliver a pulse of energy after priming. Switchable source of energy 12 will generally not be a battery and a manual switch, but will in an overall system be a control voltage which is turned on and off. Transistor 50 can be a PNP transistor and transistor 48 can be an NPN transistor provided the polarities of diodes 46, 58 and 60 and source of potential 30 are reversed. These and other modifications and variations will satisfy many or all of the objects and gain many or all of the advantages but would not depart from the spirit of the invention as defined by the appended claims.

What is claimed is:

1. Control apparatus comprising a source of electrical energy, switch means having a first terminal coupled to said source of electrical energy and a second terminal, electrical energy storage means, means for coupling said electrical energy storage means to said second terminal, transistor switch means having an input terminal, an output terminal and a control terminal, means for coupling said input terminal to said electrical energy storage means, a load, means for coupling said output terminal to said load, a reactive timing circuit, means for coupling said reactive timing circuit to said second terminal, and means for couplng said reactive timing circuit to said control terminal so that when said switch means is closed said electrical energy storage means acquires a quantum of electrical energy and said reactive timing circuit is energized to prevent conduction by said transistor switch means and when said switch is opened said reactive timing circuit deenergizes in a predetermined time to cause the conduction of electrical energy from said electrical energy storage means via said transistor switch means to said load.

2. Control apparatus comprising a source of potential, switch means having a first terminal coupled to said source of potential and a second terminal, a storage capacitor, means for coupling said storage capacitor to said second terminal, transistor switch means having an input terminal, an output terminal and a control terminal, means for coupling said input terminal to said storage capacitor, a load, means for coupling said output terminal to said load, a resistance-capacitance timing circuit, means for coupling said resistance-capacitance timing circuit to said second terminal, and means for coupling said resistance-capacitance timing circuit to said control terminal so that when said switch means is closed circuited said storage capacitor is charged and said resistance-capacitance circuit is charged to prevent conduction by said transistor switch means and when said switch is open circuited said resistance-capacitance circuit discharges in a predetermined time to cause the conducton of the charge from said storage capacitor via said transistor switch means to said load.

3. Control apparatus comprising a source of potential, switch means having a first terminal coupled to said source of potential and a second terminal, a storage capacitor, means for coupling said storage capacitor to said second terminal, transistor switch means having an input terminal, an output terminal and a control terminal means for coupling said input terminal to said storage capacitor, a latching relay having first and second windings, means for coupling said first winding to the second terminal of said switch, means for coupling the second winding to said output terminal, a resistance-capacitance timing circuit, and means for coupling said resistance-capacitance timing circuit to said second terminal means for coupling said resistance-capacitance timing circuit to said control terminal so that when said switch means is closed said latching relay is energized in one state, said storage capacitor is charged and said resistance-capacitance circuit is charged to prevent conduction by said transistor switch means, and when said switch is opened said resistance-capacitance circuit discharges in a predetermined time to cause the conduction of the charge from said storage capacitor via said transistor switch means to the second winding of said latching relay to energize said latching relay in another state.

4. Control apparatus comprising a source of potential having first and second terminals, a switch having first and second terminals, means for coupling the first terminal of said source of potential to the first terminal of said switch, a storage capacitor having first and second terminals, means for coupling the first terminal of said storage capacitor to the second terminal of said switch, means for coupling the second terminal of said storage capacitor to the second terminal of said source of potential, a first transistor having an emitter, a collector and a base, a second transistor having an emitter, a collector and a base, means for coupling the emitter of said first transistor to the first terminal of said storage capacitor, means for coupling the base of said first transistor to the collector of said second transistor, capacitive feedback means for coupling the collector of said first transistor to the base of said second transistor, an operating biasing network connected from the second terminal of said switch to the second terminal of said source of operating potential, means for coupling said operating biasing network to the base of said second transistor, a paralleled resistance-capacitance timing network having first and second terminals, means for coupling the first terminal of said paralleled resistance-capacitance timing network to the second terminal of said switch, means for coupling the second terminal of said paralleled resistance-capacitance timing network to the second terminal of said source of potential, means for coupling the first terminal of said resistance-capacitance timing network to the emitter of said second transistor, a load having first and second terminals, means for coupling the first terminal of said load to the second terminal of said source of potential and means for coupling the second terminal of said load to the collector of said first transistor.

5. Control apparatus comprising a source of potential having first and second terminals, a switch having first and second terminals, means for coupling the first terminal of said source of potential to the first terminal of said switch, a storage capacitor having first and second terminals, unidirectional conducting means for coupling the first terminal of said storage capacitor to the second terminal of said switch, means for coupling the second terminal of said storage capacitor to the second terminal of said source of potential, a first transistor having an emitter, a collector and a base, a second transistor having an emitter, a collector and a base, means for coupling the emitter of said first transistor to the first terminal of said storage capacitor, means for coupling the base of said first transistor to the collector of said second transistor, capacitive feedback means for coupling the collector of said first transistor to the base of said second transistor, an operating biasing network connected from the second terminal of said switch to the second terminal of said source of operating potential, unidirectional conducting means for coupling said operating biasing network to the base of said second transistor, a parallel resistance-capacitance timing network having first and second terminals, unidirectional conducting means for coupling the first terminal of said paralleled resistance-capacitance timing network to the second terminal of said switch, means for coupling the second terminal of said paralleled resistance-capacitance network to the second terminal of said source of potential, means for coupling the first terminal of said paralleled resistance-capacitance timing network to the emitter of said second transistor, a load having first and second terminals, means for coupling the first terminal of said load to the second terminal of said source of potential and means for coupling the second terminal of said load to the collector of said first transistor.

6. Control apparatus comprising a source of potential having first and second terminals, a switch having first and second terminals, means for coupling the first terminal of said source of potential to the first terminal of said switch, a storage capacitor having first and second terminals, unidirectional conducting means for coupling the first terminal of said storage capacitor to the second terminal of said switch, means for coupling the second terminal of said storage capacitor to the second terminal of said source of potential, a first transistor having an emitter, a collector and a base, a second transistor having an emitter, a collector and a base, means for coupling the emitter of said first transistor to the first terminal of said storage capacitor, means for coupling the base of said first transistor to the collector of said second transistor, capacitive feedback means for coupling the collector of said first transistor to the base of said second transistor, an operating biasing network connected from the second terminal of said switch to the second terminal of said source of operating potential, unidirectional conducting means for coupling said operating biasing network to the base of said second transistor, a paralleled resistance-capacitance timing network having first and second terminals, unidirectional conducting means for coupling the first terminal of said paralleled resistance-capacitance timing network to the second terminal of said switch, means for coupling the second terminal of said paralleled resistance-capacitance network to the second terminal of said source of potential, means for coupling the first terminal of said paralleled resistance-capacitance network to the emitter of said second transistor and a latching relay having first and second windings, means for coupling the first winding between the second terminal of said switch and the second terminal of said source of potential, and means for coupling the second winding between the collector of said first transistor and the second terminal of said source of potential.

7. An electrical control system comprising, in combination, two electric-energy storing devices; means in circuit with the storing devices for operatively connecting them to a source of electric energy to introduce into them respective charges and for operatively disconnecting the charged storing devices from the source; means responsive to the disconnecting operation of said last-recited means for discharging a first of the storing devices at a predetermined rate; an electrical control device to which two different energizations may be applied and which assumes one or the other of two conditions according to which of said energizations was last applied; means, in circuit with said first-recited means and rendered effective prior to the disconnection of the storing devices from the source, for applying one of said energizations to said control device; and two-state electric means, operatively connected with the storing devices and responsive to the voltage differential between their charges, for applying the other of said energizations to said control device when the first storing device is partially discharged.

8. An electrical control system comprising, in combination, two electric-energy storing devices; means in circuit with the storing devices for operatively connecting them to a source of electric energy to introduce into them respective charges and for operatively disconnecting the charged storing devices from the source; means responsive to the disconnecting operation of said last-recited means for discharging a first of the storing devices at a predetermined rate; a two-state electric device having a pair of terminals the potential relationship between which controls the state of the device and containing a path which in one state of the device is non-conductive and in the other state is conductive; means connected from the first storing device to the first of said terminals for applying from the discharging first storing device to said first terminal a potential, progressively varying relative to that of the second terminal, which at first maintains said path non-conductive and when the first storing device is partially discharged renders said path conductive; an electrical control device to which two different energizations may be applied and which assumes one or the other of two conditions according to which of said energizations was last applied; means, in circuit with said first-recited means and rendered effective prior to the disconnection of the storing devices from the source, for applying one of said energizations to said control device; and means, comprising the second storing device and said path and rendered effective when said path becomes conductive, for applying the other of said energizations to said control device.

References Cited by the Examiner

UNITED STATES PATENTS

| | | | |
|---|---|---|---|
| 2,635,197 | 4/1953 | Routledge et al. | 317—151 X |
| 2,645,744 | 7/1953 | Cassidy. | |
| 2,947,916 | 8/1960 | Beck | 317—148.55 |
| 3,034,024 | 5/1962 | Mierendorf | 317—148.55 |

FOREIGN PATENTS

| | | |
|---|---|---|
| 548,405 | 10/1942 | Great Britain. |
| 549,998 | 12/1942 | Great Britain. |

OTHER REFERENCES

Sokal et al.: "A Phototransistorized Photoelectric Counter," Radio and Television News, June 1954, pages 52, 53.

SAMUEL BERNSTEIN, *Primary Examiner.*

L. T. HIX, *Assistant Examiner.*